Patented Aug. 28, 1951

2,565,920

UNITED STATES PATENT OFFICE 2,565,920

TRIESTERS OF DITHIOPHOSPHORIC ACID

Edwin O. Hook, Old Greenwich, Conn., and Philip H. Moss, Nederland, Tex., assignors to American Cyanamid Company, New York, N. Y., a corporation of Maine No Drawing. Application March 26, 1948, Serial No. 17,395

10 Claims. (Cl. 252—46.6)

This invention relates to the production of triesters of dithiophosphoric acid, and particularly to the production of esters of this class which are soluble in hydrocarbon oils and possess antioxidant and anticorrosion properties therefor. Many of the esters of the invention are also good insecticides. The invention includes a novel class of dithiophosphoric acid triesters, as will hereinafter be defined, as well as certain novel methods for the preparation thereof, and hydrocarbon oils containing one or more of these esters dissolved therein.

The novel dithiophosphoric acid triesters of the invention are defined by the formula:

(1) 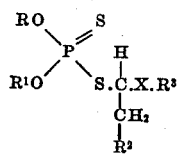

in which X is oxygen or sulfur, each of R, $R^1$ and $R^3$ is an ester-forming radical, which term includes alkyl, cycloalkyl and arylalkyl radicals as well as substituted aliphatic radicals and aromatic radicals such as a phenyl or substituted phenyl radical and $R^2$ is hydrogen or an aliphatic radical. It will thus be seen that the compounds are O,O-dialkyl-, diaryl- or mixed alkyl-aryl-S-alkylidene triesters of dithiophosphoric acid.

Most of the novel compounds of the invention are light to dark colored liquids which are soluble in lubricating oil and in benzene, toluene, kerosene, light mineral oils and other non-polar solvents. They are very effective in preventing the oxidation of mineral oils, such as mineral lubricating oils, and in preventing or reducing the corrosion of bearings lubricated by these oils, when used in amounts of 0.1-5% or more in weight, based on the weight of the oil. They also possess the property of improving the corrosion inhibition of other lubricating oil additives such as polyvalent metal salts of diesters of dithiophosphoric acid, notably barium dialkyldithiophosphates in which the alkyl radicals contain from 5-10 or more carbon atoms, calcium petroleum sulfonate and other organic oil-soluble sulfonates, alkyl phenol sulfides and their metal salts such as barium 2,4-dialkyl phenol monosulfide and the like. Many of these esters also possess insecticidal properties and may be used as pest controls in the form of solutions in kerosene or other mineral hydrocarbon solvents, or as aqueous emulsions or as mists or vapors.

The novel dithiophosphoric acid triesters of the present invention are prepared from the corresponding O,O-diesters of dithiophosphoric acid, which are well known compounds and are ordinarily produced by condensing alcohols or phenols with phosphorus pentasulfide. We have found, as an important process feature of our invention, that these diesters can be condensed with unsaturated organic compounds which contain an activating atom or group sufficiently closely associated with an ethylenic radical to activate one or more of the carbon atoms thereof. This discovery can be applied for the preparation of our novel compounds by condensing the O,O-diesters of dithiophosphoric acid with vinyl compounds which contain an adjacent oxygen or sulfur atom in the form of an ether group, which term includes both oxygen ethers and sulfur ethers or thioethers. The mechanism of this condensation reaction is shown by the following:

(2) 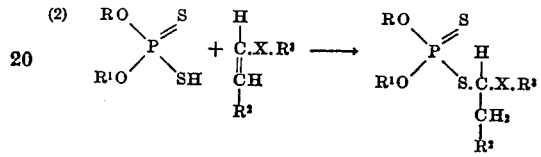

in which R, $R^1$, $R^2$ and $R^3$ are as defined above and X is a member of the group consisting of oxygen and sulfur. This condensation reaction takes place when the reagents are mixed together at ordinary room temperatures or at elevated temperatures up to 100° C. The same reaction undoubtedly takes place at even higher temperatures, but the use of more elevated temperatures is ordinarily undesirable because the free dithiophosphoric acid tends to lose hydrogen sulfide. Accordingly, the process is preferably carried out simply by mixing the reagents together at room temperature or at slightly elevated temperatures for periods of time sufficient to complete the condensation reaction; usually within from about 2 hours to about 24 hours.

We have also discovered that compounds of the type defined by Formula 1 above in which X is either oxygen or sulfur, but in which $R^3$ is an aliphatic radical, can be prepared from reagents which are in some cases cheaper than the vinyl ethers or thioethers. This can be accomplished by condensing an aliphatic monohydric alcohol or an aliphatic monomercaptan with an O,O-diester of dithiophosphoric acid and with an alkanal such as acetaldehyde, propionaldehyde, butyraldehyde or other higher aliphatic aldehyde. This condensation, like the reaction between the O,O-diesters of dithiophosphoric acid and vinyl ethers, takes place when the reagents are mixed together at ordinary room temperature or at elevated temperatures up to 100° C. or higher; however, the condensation reaction is exothermic and positive cooling of the reaction mixture is frequently advisable. The reaction is illustrated by the following equation:

(3)

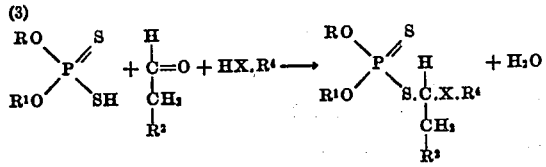

Any O,O-dialiphatic dithiophosphoric acid diester including the dicycloalkyl dithiophosphoric acid esters or any O,O-diaryl dithiophosphoric acid ester or any mixed O,O-diester of dithiophosphoric acid may be used in practicing the process of our invention and in producing the novel products thereof. When compounds having a relatively high percentage of combined phosphorus and sulfur are desired, as in the production of lubricating oil antioxidants having a high activity at relatively low temperatures, it is preferable to employ an O,O-dialkyl dithiophosphoric acid in which the alkyl groups are of relatively low molecular weight, such as methyl, ethyl, propyl or butyl radicals. Dialkyl dithiophosphoric acids of higher molecular weight may of course be employed, such as diamyl, di-n-hexyl, dicyclohexyl or dioctyl dithiophosphoric acids, as well as the didecyl, didodecyl, ditetradecyl or dioctydecyl dithiophosphoric acids. The O,O-diaryl dithiophosphoric acids may frequently be used to advantage, as in the production of lubricating oil additives having a high degree of heat stability wherein the O,O-di-phenyl-, O,O-di-alkylphenyl-, and O,O-di-naphthyl dithiophosphoric acids may be employed. Still other diaryl dithiophosphoric acids may be used in the production of compounds for other purposes; thus, for example, in the production of insecticides and fungicides the use of O,O-di-chlorphenyl or dibromphenyl dithiophosphoric acids for condensation with vinyl ethers in accordance with the process of the invention is frequently advantageous. It will be understood that mixed O,O-dithiophosphoric acid diesters may also be employed, as where a mixed alkyl-phenyl dithiophosphoric acid is condensed with a vinyl ether to combine the oil-solubilizing properties of an aliphatic radical with the heat-stabilizing and sludge-inhibiting properties of the phenolic and particularly the alkylphenyl derivatives in a lubricating oil.

Any vinyl ether may be condensed with an O,O-diester of dithiophosphoric acid in practicing the invention. Simple aliphatic ethers such as a vinylmethyl or vinylethyl ether may be used, particularly in the preparation of insecticides where a compound of relatively low molecular weight is desired. The higher vinyl aliphatic ethers such as vinylpropyl ethers, vinylbutyl ethers, vinylamyl ether, vinylhexyl or cyclohexyl ethers, vinyloctyl ethers or vinyldecyl ethers, are more often employed in the preparation of lubricating oil additives in order to take advantage of the oil-solubilizing action of aliphatic radicals therein. However, it should be understood that the invention is not limited to the employment of the higher vinylalkyl ethers for this purpose, since even such a low molecular weight compound as O,O - diethyldithiophosphatoethyl methyl ether is sufficeintly soluble in lubricating oil to be used as an antioxidant therein.

The corresponding vinylaryl ethers may also be employed to produce condensation products in accordance with the invention, and are useful in the preparation of lubricating oil additives. Typical ethers of this class that may be employed are the vinylphenyl ether, the vinyl-p-amyl-phenyl ether, vinyl-p-octylphenyl ether, vinyl-2,4-dialkylphenyl ethers such as the 2,4-dibutyl- or diamylphenyl ether or the 2-methyl, 4-octylphenyl ether. Ethers of halogenated phenols may also be used, particularly in the production of dithiophosphoric acid triesters of enhanced insecticidal properties.

As is noted above, the condensation between the O,O-dithiophosphoric acid diesters and the vinyl ethers can be carried out simply by mixing the two reagents together. No particular ratio of reacting ingredients need be maintained, as the reaction is substantially quantitative and a molar excess of one reagent over the other simply remains in the reaction mixture and can be made to serve the purpose of a diluent if desired. Other non-reactive diluents such as volatile hydrocarbons of the type of benzene, toluene, solvent naphtha and the like may be used if desired. The condensation product is easily recovered from the reaction mixture in a purified form by washing with water or a dilute aqueous sodium carbonate solution, or both, followed by heating to 90–100° C. at reduced pressure to strip off volatile impurities. The purified products are light to dark liquids which are soluble in hydrocarbon solvents and inlubricating oils, including both the paraffin-base and naphthenate-base oils, and possess good antioxidant and anti-corrosion properties therefor.

Any aliphatic monohydric alcohol or monomercaptan may be used in practicing the second process of our invention; i. e. the condensation of an O,O-diester of dithiophosphoric acid with an alcohol or mercaptan and a higher aliphatic aldehyde. Aliphatic monohydric alcohols which may be used include the saturated alkanols such as ethanol, methanol, etc. up to and including octadecanol, and either the straight-chain or branched-chain normal, secondary or tertiary alcohols may be used. The corresponding mercaptans of 1–18 or more carbon atoms may also be employed, or mixtures of alcohols and mercaptans may be used. Similarly, any higher aliphatic monoaldehyde may be employed, typical examples being acetaldehyde, butyraldehyde, isobutyraldehyde, valeraldehyde, hexaldehyde, octanaldehyde, myristic aldehyde, stearic aldehyde, or in general any aliphatic aldehyde of 2 to 18 carbon atoms inclusive.

As is noted above, the condensation between the O,O-dithiophosphoric acid diesters and the monohydric or polyhydric aliphatic alcohol or mercaptan can be carried out simply by mixing these two reagents with the aldehyde. It is unnecessary to maintain any particular ratio of reacting ingredients, as the three reagents condense in equimolecular ratios; in fact it is frequently convenient to maintain an excess of alcohol or mercaptan present in the reaction to function as a diluent. Other no-reactive diluents such as volatile hydrocarbons of the type of benzene, toluene, solvent naphtha and the like may be used if desired. The condensation product is easily recovered from the reaction mixture in a purified form by washing with water or a dilute aqueous sodium carbonate solution, or both, followed by heating to 90–100° C. at reduced pressure to strip off volatile impurities.

The novel products of the present invention are preferably used in lubricating oils in relatively small quantities which may vary from about 0.1% up to about 4-5% or greater, depending on the particular oil and on the degree of protection desired therein. In automobile engine lubricating oils, quantities on the order of 0.2% to 2-3% are usually incorporated into the oil. Our novel antioxidants are compatible with all of the commonly used detergents, stabilizers, sludge-inhibitors and other ingredients of compounded oils and may be used in conjunction with smaller or larger quantities of aliphatic or aromatic sulfonates such as calcium petronate, alkyl phenol sulfides such as p-p'-dibutyl-, diamyl- or dioctyl phenol mono- or polysulfides and their polyvalent metal salts, 2,4-dialkyl phenol mono- or polysulfides and their metal salts and metal salts of oxygen- or sulfur-containing acids of phosphorus such as those described in U. S. Patents Nos. 2,364,284 and 2,228,658 and Reissue 22,829. These and other additives are usually employed in the oils in quantities of about 0.1-5%, most commonly in quantities of about 0.5-2%, in admixture with the antioxidants of the present invention.

The invention will be further illustrated in greater detail by the following specific examples. It should be understood, however, that although these examples may describe in detail some of the specific features of the invention, they are given primarily for purposes of illustration and the invention in its broader aspects is not limited thereto.

Example 1

To 41 grams (0.2 mol) of distilled diethyl dithiophosphoric acid, prepared by the reaction of 4 mols of ethanol with 1 mol of $P_2S_5$ at 95° C. for about 2½ hours, was added slowly 22 grams (0.22 mol) of vinyl n-butyl ether while cooling to maintain the reaction mixture below 60° C. After the initial reaction had subsided the liquid was warmed for a short time on a steam bath. The condensation reaction was as follows:

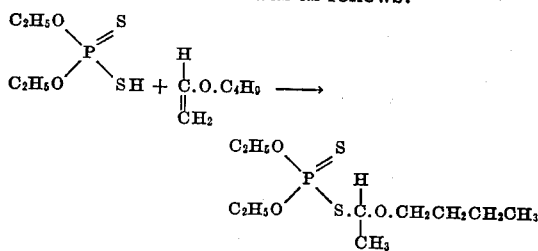

The product was a colorless liquid, free from hydrogen sulfide and easily soluble in lubricating oil.

A sample was tested as an antioxidant by the Underwood corrosion test using cadmium-silver alloy bearings as test material. A 1500 cc. sample of Mid-Continent base lubricating oil of SAE 30 grade containing 1 per cent by weight of the additive and 0.04% iron naphthenate, based on the $Fe_2O_3$ equivalent, as oxidation catalyst was heated for 10 hours at 325° F. while continuously spraying portions of the oil against two freshly sanded alloy bearings, the apparatus being so constructed as to permit free circulation of air. The total bearing loss was 9 milligrams, whereas the loss with a sample of the same oil containing the same quantity of iron naphthenate but no antioxidant was 1097 milligrams.

Example 2

The procedure of Example 1 was repeated using 22 grams of vinyl isobutyl ether. A similar product was obtained which was easily soluble in lubricating oil.

Example 3

Di-n-butyldithiophosphoric acid was prepared by reacting $P_2S_5$ with n-butanol. A 40 gram sample of the product was placed in an ice-cooled flask and 16.5 grams of vinyl n-butyl ether were added slowly. When the addition was complete the mixture was heated at 95° C. for a short time. The product, a light-colored liquid, was the di-butyldithiophosphatoethyl-n-butyl ether of the formula:

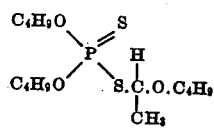

A sample of the product was dissolved in Mid-Continent base SAE 30 lubricating oil to a 1% solution. The bearing corrosion loss was 8 milligrams when the oil was tested as described in Example 1.

Example 4

One hundred forty-seven grams (0.5 mol) of O,O-dicyclohexyldithiophosphoric acid was placed in a cooled reaction flask and 50 grams of vinyl-n-butyl ether were added slowly followed by heating the mixture for a short time at 80-85° C. The resulting liquid product was the O,O-dicyclohexyldithiophosphatoethyl - n - isobutyl ether, which was easily soluble in lubricating oil.

Example 5

Diphenyldithiophosphoric acid was prepared by reacting C. P. phenol with $P_2S_5$ in a molar ratio of 4:1. A benzene solution containing 14.1 grams of the product was stirred in a reaction flask and 7 grams of 2-ethylhexylvinyl ether were added. The temperature of the mixture rose to 60° C. during the addition. The flask was then allowed to cool to room temperature and to stand overnight.

Upon distilling off the benzene the product was obtained as a light-colored liquid, easily soluble in lubricating oil, the yield being quantitative. It was the compound:

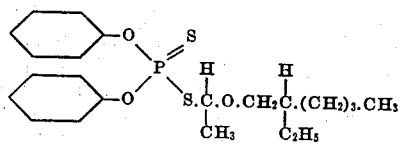

Example 6

Twenty-nine grams (0.125 mol) of p-tertiary-octylphenylvinyl ether was added slowly with cooling to 25 grams (0.125 mol) of distilled diethyldithiophosphoric acid. The mixture was heated at 90° C. for 45 minutes and was then cooled, dissolved in benzene and washed with water, then with a 5% sodium carbonate solution and again with water. The product, weighing 54 grams, was isolated by distilling off the solvent under reduced pressure. It was a light-colored, clear, moderately viscous liquid that was soluble in lubricating oil and corresponded to the formula:

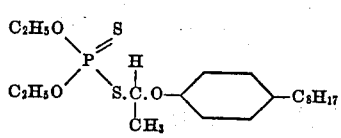

Example 7

The procedure of Example 6 was repeated using 25 grams of the diethyldithiophosphoric acid and 20 grams (0.125 mol) of p-chlorophenylvinyl ether. A nearly colorless product weighing 45 grams and easily soluble in lubricating oil was obtained after completing the purification.

Example 8

A 25 gram sample of distilled diethyldithiophosphoric acid was condensed with 15 grams (0.125 mol) of phenylvinyl ether by the procedure described in Example 6. The purified product weighed 40 grams and was a light-colored liquid that was soluble in lubricating oil.

Example 9

Fifteen grams (0.125 mol) of phenylvinyl ether was added slowly and with cooling to 39 grams (0.125 mol) of di(methylisobutylcarbinyl)dithiophosphoric acid. The mixture was heated for one hour on a steam bath and was then cooled and purified as in Example 6. The product, weighing 45 grams, was easily soluble in lubricating oil and was a clear, dark liquid. Its composition is shown by the formula:

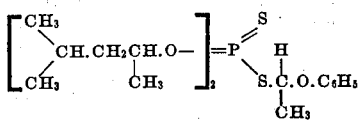

Example 10

Thirty-four grams of vinyl 2-ethylhexyl ether was added slowly and with stirring to 40 grams of distilled diethyldithiophosphoric acid having a neutralization equivalent of 220. The mixture was heated 20 minutes on a steam bath to complete the reaction, after which the product was obtained as a colorless, non-viscous liquid that was easily soluble in lubricating oil.

A sample of the diethyldithiophosphatoethyl 2-ethylhexyl ether so obtained was dissolved in a Mid-Continent base SAE 30 oil to a 1% solution and the oil was subjected to the test described in Example 1. The bearing corrosion loss was 42 milligrams.

Example 11

A mixture of 40 grams of "B-24 alcohol" (see U. S. Patent No. 2,368,000), 30 grams of n-decanol, 20 grams of p-octylphenol and 10 grams of methylisobutyl carbinol was reacted with 41 grams of $P_2S_5$ at 95° C. for about 2½ hours and the resulting dithiophosphoric acid diester was filtered.

Five and one-half grams of vinyl n-butyl ether was added slowly to a 60 gram portion of the above dithiophosphoric acid diester and the mixture was then heated at 95° C. for 20 minutes. The reaction product, a brown liquid, was tested as a lubricating oil antioxidant in an SAE 30 Mid-Continent base oil, using 0.5% by weight in the oil together with 0.04% of iron naphthenate and following the procedure described in Example 1. The bearing corrosion loss was 5 milligrams.

Example 12

A mixture of 61 grams (0.25 mol) of di-n-propyldithiophosphoric acid and 46 grams (1.0 mol) of ethanol was prepared and 14 grams (0.32 mol) of acetaldehyde was added with agitation and cooling. The mixture was then allowed to stand overnight after which the reaction product was washed well with water and stripped of volatiles by heating under reduced pressure on a steam bath. The product weighed 66 grams and was a thin, nearly colorless liquid which was found by analysis to contain 24.1% sulfur and 13% phosphorus. It was the O,O-di-n-propyl-S-ethoxyethylidenedithiophosphate.

Example 13

Twenty-two grams (0.31 mol) of butyraldehyde was added to a mixture of 61 grams (0.25 mol) of di-n-propyldithiophosphoric acid and 46 grams (1.0 mol) of ethanol and the mixture was agitated for two hours at room temperature and then allowed to stand overnight. The product was washed with water and then with dilute sodium carbonate solution and was heated on a steam bath at reduced pressure. There was obtained 80 grams of a light-colored liquid which was easily soluble in lubricating oil. It was the O,O - di - n - propyl - S - ethoxybutylidenedithiophosphate.

Example 14

Following the procedure described in the previous example, 14 grams of acetaldehyde was added to a mixture of 54 grams (0.25 mol) of diethyldithiophosphoric acid and 23 grams (0.25 mol) of tertiary-butylmercaptan. After washing and stripping there was obtained 91 grams of O,O-diethyl - S - tert. butylthioethylidenedithiophosphate, a light-colored liquid which contained 27.5% of sulfur and 9.2% phosphorus.

Example 15

A mixture of 109 grams (0.5 mol) of diethyldithiophosphoric acid and 46 grams (1 mol) of ethanol was prepared and 57 grams (0.5 mol) of heptaldehyde was added with stirring. The mixture was heated on a steam bath for one hour and then allowed to stand overnight. The product, a turbid oil, was washed with water and dilute sodium carbonate solution and stripped at reduced pressure on a steam bath after which a yield of 150 grams of an oil-soluble liquid was obtained.

What we claim is:

1. A triester of dithiophosphoric acid of the formula

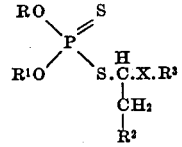

in which X is a member of the group consisting of oxygen and sulfur, each of R, $R^1$ and $R^3$ is a member of the group consisting of alkyl and aromatic radicals and $R^2$ is a member of the group consisting of hydrogen and alkyl radicals.

2. A triester of dithiophosphoric acid of the formula

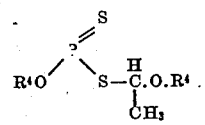

in which each $R^4$ is an alkyl radical.

3. A triester of dithiophosphoric acid of the formula

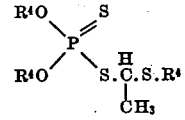

in which each $R^4$ is an alkyl radical.

4. A triester of dithiophosphoric acid of the formula

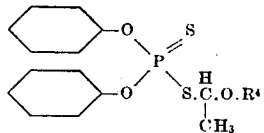

in which R⁴ is an alkyl radical.

5. A triester of dithiophosphoric acid of the formula

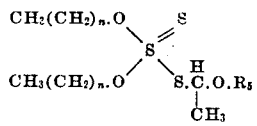

in which $n$ is a whole number from 1 to 17 and R⁵ is an aromatic radical.

6. A method of producing a triester of dithiophosphoric acid which comprises condensing an O,O-diester of dithiophosphoric acid with a vinyl ether of the formula

in which X is a member of the group consisting of oxygen and sulfur, R³ is a member of the group consisting of alkyl and aromatic radicals and R² is a member of the group consisting of hydrogen and alkyl radicals.

7. A method of producing an O,O-dialkyl-S-alkylidene triester of dithiophosphoric acid which comprises condensing an O,O-dialkyldithiophosphoric acid diester with a vinyl ether of the formula

in which X is a member of the group consisting of oxygen and sulfur, R³ is a member of the group consisting of alkyl and aromatic radicals and R² is a member of the group consisting of hydrogen and alkyl radicals.

8. A method of producing an O,O-dialkyl-S-alkoxyalkylidene dithiophosphate which comprises condensing an O,O-dialkyldithiophosphoric acid diester with a vinylalkyl ether.

9. A method of producing an O,O-dialkyl-S-aryloxyalkylidene dithiophosphate which comprises condensing an O,O-dialkyldithiophosphoric acid diester with a vinylaryl ether.

10. A hydrocarbon oil composition comprising a relatively large proportion of a hydrocarbon oil having dissolved therein a relatively small amount, sufficient to reduce oxidation in said oil, of a triester of dithiophosphoric acid of the formula

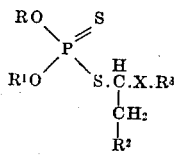

in which X is a member of the group consisting of oxygen and sulfur, each of R, R¹ and R³ is a member of the group consisting of alkyl and aromatic radicals and R² is a member of the group consisting of hydrogen and alkyl and aromatic radicals.

EDWIN O. HOOK.
PHILIP H. MOSS.

REFERENCES CITED

The following references are of record in the file of this patent:

UNITED STATES PATENTS

| Number | Name | Date |
|---|---|---|
| 1,982,903 | Clemmensen | Dec. 4, 1934 |
| 2,063,629 | Salzberg et al. | Dec. 8, 1936 |
| 2,167,867 | Benning et al. | Aug. 1, 1939 |
| 2,346,155 | Denison et al. | Apr. 11, 1944 |